(12) United States Patent
Wilson et al.

(10) Patent No.: US 7,280,352 B2
(45) Date of Patent: Oct. 9, 2007

(54) DRIVE CARRIER

(75) Inventors: Helenaur Wilson, Camberley (GB); Sean Conor Wrycraft, Hindhead (GB); Andrew Donovan, Reading (GB)

(73) Assignee: Sun Microsystems, Inc., Santa Clara, CA (US)

( * ) Notice: Subject to any disclaimer, the term of this patent is extended or adjusted under 35 U.S.C. 154(b) by 111 days.

(21) Appl. No.: 10/862,687

(22) Filed: Jun. 7, 2004

(65) Prior Publication Data

US 2005/0270737 A1  Dec. 8, 2005

(51) Int. Cl.
G06F 1/16 (2006.01)

(52) U.S. Cl. .................... 361/685; 361/725; 312/223.1

(58) Field of Classification Search ................ 361/685, 361/725; 312/223.1, 223.2
See application file for complete search history.

(56) References Cited

U.S. PATENT DOCUMENTS

| 3,193,342 A | 7/1965 | Sauter |
| 3,899,794 A | 8/1975 | Brown, Jr. |
| 4,365,831 A | 12/1982 | Bourne |
| 4,421,372 A | 12/1983 | Golden |
| 4,597,173 A | 7/1986 | Chino et al. |
| 4,778,401 A | 10/1988 | Boudreau et al. |
| 4,872,853 A | 10/1989 | Webster |
| 4,941,841 A | 7/1990 | Darden et al. |
| 5,003,431 A | 3/1991 | Imsdahl |
| 5,172,520 A | 12/1992 | Hostetler et al. |
| 5,222,897 A | 6/1993 | Collins et al. |
| 5,229,919 A | 7/1993 | Chen |
| 5,255,154 A | 10/1993 | Hosoi et al. |
| 5,332,306 A | 7/1994 | Babb et al. |
| 5,340,340 A * | 8/1994 | Hastings et al. ............. 439/64 |
| 5,442,513 A | 8/1995 | Lo |
| 5,483,419 A | 1/1996 | Kaczeus, Sr. et al. |
| 5,504,648 A | 4/1996 | Honda et al. |
| 5,506,758 A | 4/1996 | Cromwell |
| 5,557,499 A | 9/1996 | Reiter et al. |
| 5,563,767 A | 10/1996 | Chen |
| 5,653,518 A | 8/1997 | Hardt |
| 5,654,873 A * | 8/1997 | Smithson et al. ........... 361/685 |
| 5,673,172 A | 9/1997 | Hastings et al. |
| 5,691,859 A | 11/1997 | Ulrich et al. |
| 5,734,557 A | 3/1998 | McAnally et al. |

(Continued)

OTHER PUBLICATIONS

International Search Report, International application No. PCT/US2005/019655, Oct. 27, 2005.

(Continued)

Primary Examiner—Jayprakash Gandhi
Assistant Examiner—Ingrid Wright
(74) Attorney, Agent, or Firm—Meyertons Hood Kivlin Kowert & Goetzel, P.C.; B. Noël Kivlin

(57) ABSTRACT

There is provided a drive carrier. The drive carrier is configured to receive a media drive and is also configured to be removably receivable in a receiving location of a computer system. The drive carrier includes a base portion, a handle portion and a latch mechanism for securing the carrier within the receiving location. The base portion and the handle portion are configured to co-operate to operate the latch mechanism on insertion and/or removal of the carrier from the receiving location, for inserting and/or removing the carrier from the receiving location and operating the latch mechanism with a single movement of the handle portion.

34 Claims, 13 Drawing Sheets

U.S. PATENT DOCUMENTS

| | | | |
|---|---|---|---|
| 5,765,933 A * | 6/1998 | Paul et al. ............... | 312/332.1 |
| 5,980,281 A | 11/1999 | Neal et al. | |
| 6,050,658 A * | 4/2000 | O'Sullivan et al. ...... | 312/223.1 |
| 6,056,567 A | 5/2000 | Schell | |
| 6,067,225 A | 5/2000 | Reznikov et al. | |
| 6,193,339 B1 | 2/2001 | Behl et al. | |
| 6,227,630 B1 * | 5/2001 | Brown et al. ............ | 312/223.2 |
| 6,252,514 B1 | 6/2001 | Nolan et al. | |
| 6,288,902 B1 | 9/2001 | Kim et al. | |
| 6,362,416 B1 * | 3/2002 | Denny et al. ............... | 174/365 |
| 6,373,713 B1 | 4/2002 | Jensen et al. | |
| 6,378,965 B1 * | 4/2002 | Reznikov et al. ........ | 312/332.1 |
| 6,413,122 B2 | 7/2002 | Fujioka | |
| 6,421,236 B1 * | 7/2002 | Montoya et al. ........... | 361/685 |
| 6,433,825 B1 | 8/2002 | Cama et al. | |
| 6,480,391 B1 * | 11/2002 | Monson et al. ............. | 361/752 |
| 6,618,264 B2 | 9/2003 | Megason et al. | |
| 6,665,908 B1 * | 12/2003 | Mease ......................... | 16/422 |
| 6,762,934 B2 * | 7/2004 | Kitchen et al. ............. | 361/685 |
| 6,795,307 B2 | 9/2004 | Arbogast et al. | |
| 6,798,650 B2 | 9/2004 | Reznikov et al. | |
| 6,802,117 B2 | 10/2004 | Dalisay | |
| 6,820,953 B2 * | 11/2004 | Wojcik .................... | 312/332.1 |
| 7,014,484 B2 * | 3/2006 | Hagiwara ................... | 439/159 |
| 7,054,965 B2 * | 5/2006 | Bell et al. ...................... | 710/72 |
| 7,139,166 B2 * | 11/2006 | Marcade et al. ............ | 361/685 |
| 7,206,201 B2 * | 4/2007 | Behl et al. .................. | 361/687 |
| 2002/0017838 A1 * | 2/2002 | Roesner et al. .......... | 312/223.1 |
| 2002/0094713 A1 * | 7/2002 | Gough et al. ............... | 439/358 |
| 2003/0206402 A1 * | 11/2003 | Tsuyuki et al. ............. | 361/725 |

OTHER PUBLICATIONS

Written Opinion of the International Searching Authority, International application No. PCT/2005/019655, Oct. 27, 2005.

PCT Notification Concerning Transmittal of Copy of International Preliminary Report on Patentability, International application No. PCT/2005/019655, Dec. 21, 2006.

Written Opinion of the International Searching Authority, International application No. PCT/2005/019655, Dec. 21, 2006.

* cited by examiner

DRIVE CARRIER

BACKGROUND OF THE INVENTION

This invention relates to drive carriers for media drives. More specifically, this invention relates to drive carriers which are configured to receive a media drive, and which are also configured to be removably receivable in a receiving location of a computer system.

Computer systems typically include one or more media drives such as a hard disk drives, CD ROM drives or DVD drives. One or more receiving locations can be included in the chassis of a computer for receiving these drives. The media drives can either be directly mounted within those receiving locations, or may be first received in a carrier, which is itself receivable in a receiving location.

Existing solutions for installing media drives within a computer system often fail to effectively address one or more of the following design considerations.

It is often desirable that a media drive be configured as a field replaceable unit (FRU) and that it be hot-pluggable so as to reduce down time in the event that the media drive needs replacing. Accordingly, it is desirable that the media drive be quickly and easily installable within the chassis of a computer system, as well as quickly and easily removable. While it is known to provide drive carriers which allow a media drive to be slideably inserted into a receiving location, these drive carriers require a number of separate steps to be taken to insert and then secure the drive carrier in place. For example, it may be necessary to first push the drive carrier into the receiving location and then perform a separate operation to secure the drive carrier once it is in place. For example, when holding the handle of a drive carrier, a first movement in a first direction may be required to insert the drive carrier into a receiving location and then a second, separate movement of a handle of the drive carrier in a direction different to the first direction (for example a pivotal motion) may be required to secure the drive carrier in the receiving location. Existing drive carriers also often fail to provide a user with feedback on insertion of the drive into a receiving location, whereby it is often not apparent whether the drive is correctly positioned/received.

It is also desirable that a media drive be provided with a degree of electromagnetic interference (EMI) protection. Protection against electrostatic discharge (ESD) is also desirable. Features which protect against EMI and ESD often include metal protrusions which protrude from the drive carrier to press against a metallic feature of a receiving location such as a wall of the receiving location or a neighbouring media drive. These features can thus hinder easy insertion/removal of the media drive within/from the receiving location since sliding resistance against the insertion/removal is increased.

The present invention aims to provide a drive carrier for a media drive which addresses at least some of the problems of existing drive carriers indicated above.

SUMMARY OF THE INVENTION

An aspect of the invention provides a drive carrier. The drive carrier is configured to receive a media drive and is also configured to be removably receivable in a receiving location of a computer system. The carrier includes a base portion, a handle portion and a latch mechanism for securing the carrier within the receiving location. The base portion and the handle portion are configured to co-operate to operate the latch mechanism on insertion and/or removal of the carrier from the receiving location, for inserting and/or removing the carrier from the receiving location and operating the latch mechanism with a single movement of the handle portion.

The single movement can be a linear movement in a single direction, such as the direction of insertion/removal of the drive carrier from the receiving location.

The handle portion can be actuable to move between a first position and a second position relative to the base portion for operating the latch mechanism. The single movement of the handle portion can include actuating the handle between the first position and the second position. When the handle is in the first position the latch mechanism can be in a deployed state, and when the handle is in the second position, the latch mechanism can be in a retracted state. The latch mechanism can include a resilient latch portion and an aperture in the handle portion. When the latch mechanism is in the deployed state, the latch portion can protrude through the aperture in the handle portion for engaging with a formation of a receiving location. Movement of the handle from the first position to the second position can cause the latch portion to be retracted through the aperture in the handle portion.

The drive carrier can also include a plurality of electromagnetic interference (EMI) fingers. The fingers can be configured to occupy a deployed position in which they can abut a neighbouring drive carrier, media drive or inner wall of the receiving location, and a retracted position for reducing sliding resistance on insertion and/or removal of the drive carrier from the receiving location. Movement of the handle portion between the first position and the second position can move the EMI fingers between the deployed position and the retracted position, as well as operate the latch mechanism.

The drive carrier can be provided with one or more electrostatic discharge (ESD) fingers.

Another aspect of the invention provides drive carrier means for receiving a media drive, the carrier means being configured to be removably receivable in a receiving location of a computer system. The drive carrier means includes base means, handle means and latch means for securing the carrier means within the receiving location. The base means and the handle means are configured to co-operate to operate the latch means on insertion and/or removal of the carrier means from the receiving location, for inserting and/or removing the carrier means from the receiving location and operating the latch means with a single movement of the handle means.

A further aspect of the invention provides a drive carrier and a media drive received in the drive carrier. The carrier is configured to be removably receivable in a receiving location of a computer system. The carrier includes a base portion, a handle portion, and a latch mechanism for securing the carrier within the receiving location. The base portion and the handle portion are configured to co-operate to operate the latch mechanism on insertion and/or removal of the carrier from the receiving location, for inserting and/or removing the carrier from the receiving location and operating the latch mechanism with a single movement of the handle portion.

Another aspect of the invention provides a computer system which includes a receiving location and a drive carrier removably received within the receiving location. The drive carrier is configured to receive a media drive and includes a base portion, a handle portion, and a latch mechanism for securing the carrier within the receiving location. The base portion and the handle portion are configured to co-operate to operate the latch mechanism on insertion and/or removal of the carrier from the receiving location, for inserting and/or removing the carrier from the receiving location and operating the latch mechanism with a single movement of the handle portion.

A further aspect of the invention provides a method of removing a media drive from a computer system. The method includes providing a drive carrier. The drive carrier has the media drive received therein and is removably received within a receiving location of the computer system. The drive carrier includes a base portion, a handle portion and a latch mechanism for securing the carrier within the receiving location. The base portion and the handle portion are configured to co-operate to operate the latch mechanism on insertion and/or removal of the carrier from the receiving location, for inserting and/or removing the carrier from the receiving location and operating the latch mechanism with a single movement of the handle portion. The method also includes moving the handle to operate the latch mechanism and remove the carrier from the receiving location.

The movement can be a single, linear movement. The single movement can include actuating the handle portion relative to the base portion from a first position in which the latch mechanism is in a deployed state for securing the drive carrier within the receiving location, to a second position in which the latch mechanism is in a retracted state. The single movement can subsequently include sliding the drive carrier and the media drive out from the receiving location.

Another aspect of the invention provides a method of installing a media drive in a computer system. The method includes providing a drive carrier having the media drive received therein. The drive carrier includes a base portion, a handle portion and a latch mechanism for securing the carrier within the receiving location. The base portion and the handle portion are configured to co-operate to operate the latch mechanism on insertion and/or removal of the carrier from the receiving location, for inserting and/or removing the carrier from the receiving location and operating the latch mechanism with a single movement of the handle portion. The method also includes moving the handle to insert the carrier within the receiving location and to operate the latch mechanism.

The movement can be a single, linear movement. The single movement can include sliding the drive carrier and the media drive into the receiving location. The single movement can subsequently include actuating the handle portion relative to the base portion from a second position in which the latch mechanism is in a retracted state to a first position in which the latch mechanism is in a deployed state for securing the drive carrier within the receiving location.

BRIEF DESCRIPTION OF THE DRAWINGS

Embodiments of the present invention will be described hereinafter, by way of example only, with reference to the accompanying drawings in which like reference signs relate to like elements and in which.

Figure 1:
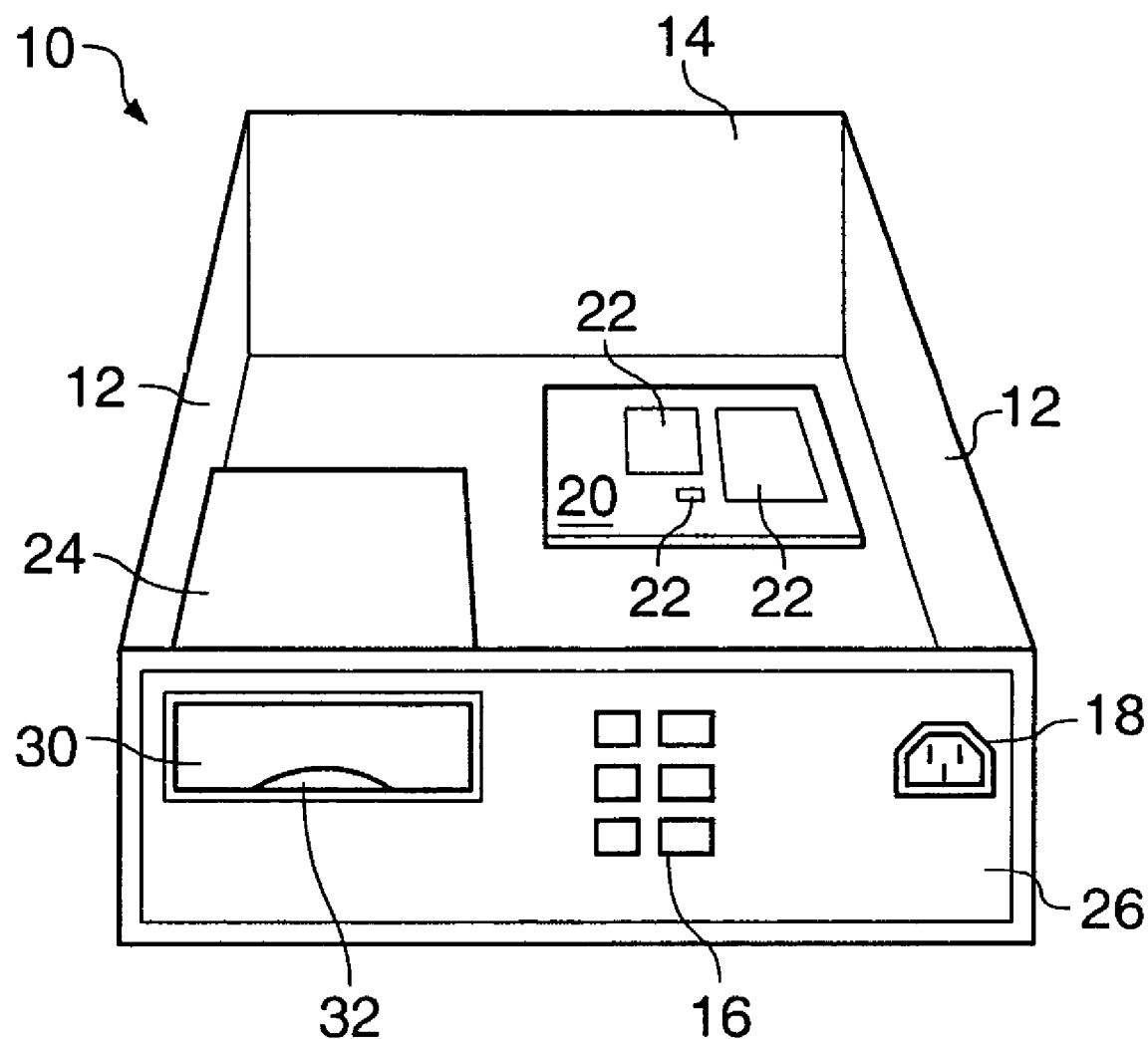
FIG. 1 illustrates an example of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents, and alternatives falling within the spirit and scope of the present invention as defined by the appended claims.

DESCRIPTION OF PARTICULAR EMBODIMENTS

Embodiments and examples are described hereafter by way of example only in the following with reference to the accompanying drawings.

FIG. 1 shows an example of a computer system 10. The computer system 10 includes a housing which has a front side 14, a rear side 26 and two opposing sides 12. For the purposes of clarity the top side of the housing is not shown in FIG. 1 so as not to obscure the interior of the housing. The computer system 10 may also include a number of peripheral devices such as a monitor, a keyboard and a mouse—these are also omitted in FIG. 1. A number of components can be provided within the housing. For example, in FIG. 1 there is shown a motherboard 20, which itself has a number of components 22 mounted thereon. Also shown in FIG. 1 is a receiving location 24 for receiving a media drive within the housing. In this example, the receiving location 24 is accessible through an aperture in the rear side 26 of the housing. However, in other examples the receiving location may be accessible from another side of the housing (eg the front side 14). The rear side 26 can also include other features such as a power socket 18, a number of ports 16 and so forth. In this example, a media drive is received within a carrier, which is itself received within the receiving location 24. A handle portion 30 of the drive carrier is accessible at the aperture in the rear side 26.

Figure 2:
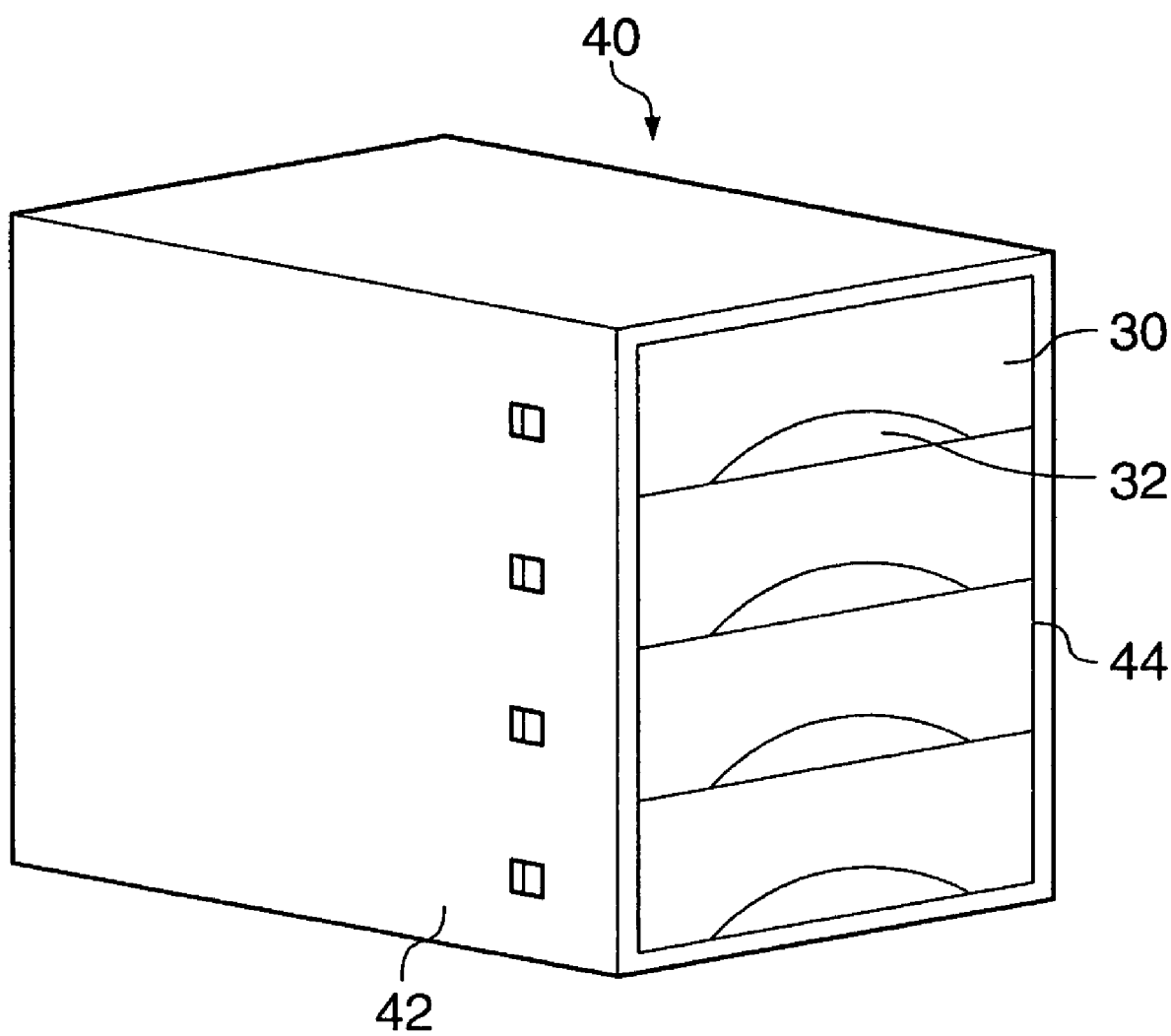
FIG. 2 illustrates an example of a storage array in a computer system.

FIG. 2 shows an example of a storage array 40 which may be incorporated as part of a larger computer system. The storage array 40 includes a housing 42 within which a number of drive carriers are received. The housing 42 includes a front face 44 through which the drive carriers may be inserted/removed. The storage array 40 shown in FIG. 2 has four drive carriers received therein. Each drive carrier includes a handle portion 30, which is accessible through the front face 44 of the housing 42.

Figure 3:
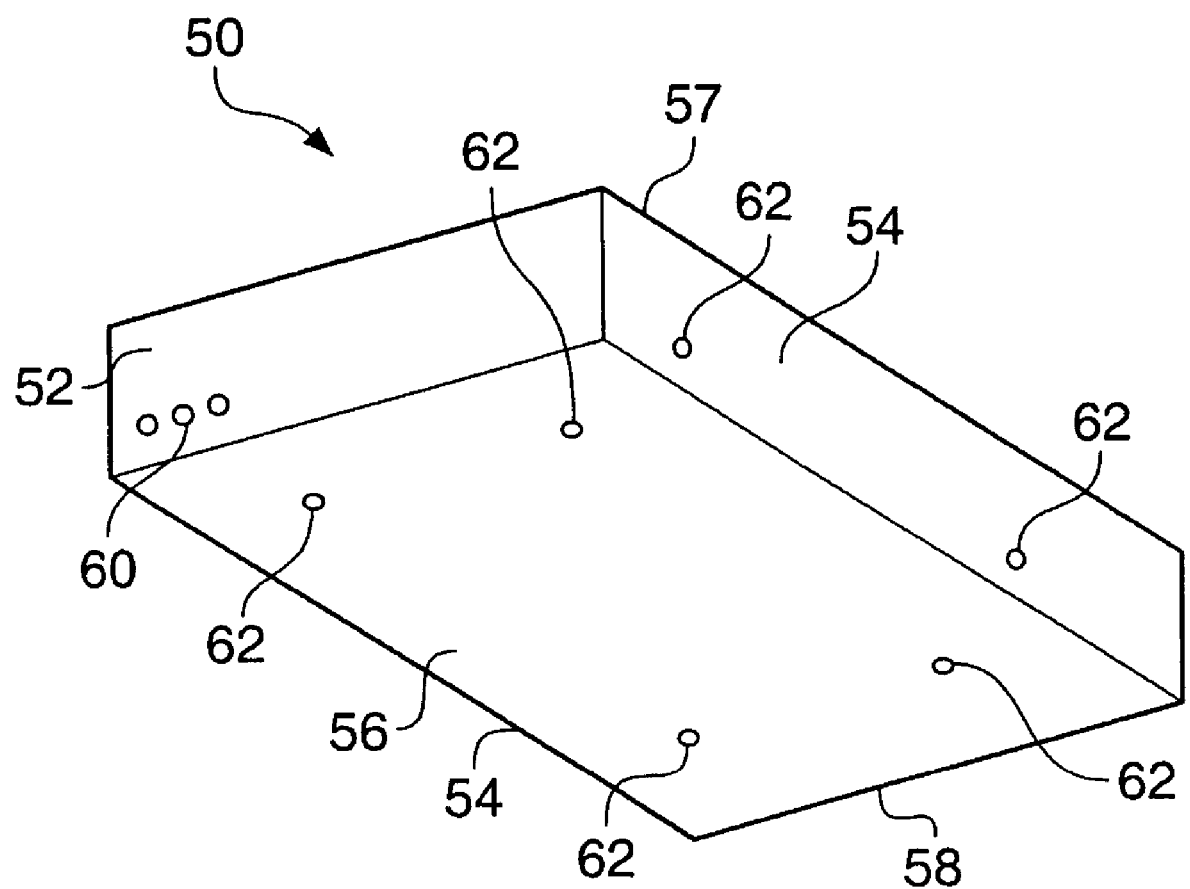
FIG. 3 illustrates an example of a media drive.

FIG. 3 shows an example of a media drive 50, which is receivable within a drive carrier. The media drive may, for example, be a hard disk drive such as a 2.5" serial attached SCSI (SAS) or serial ATA (SATA) hard disk drive. Alternatively, the media drive 50 may be a CD ROM drive or DVD drive.

In this example, the media drive has a front side 52, a rear side 58, two opposing sides 54, an upper side 57 and a lower side 56. The media drive can include a number of features 62 (eg screw holes) to facilitate mounting of the media drive 50 in a drive carrier. The media drive 50 can include a number of indicator lights for indicating a status of the drive e.g. an on/off state and/or whether the drive is presently being accessed. In this example, three indicator lights 60 are provided on the front side 52 of the media drive 50.

An example of a drive carrier 70 will now be described with reference to FIGS. 4 to 9.

The drive carrier 70 shown in FIGS. 4 to 8 includes a base portion 110 and a handle portion 30. In this example, a media drive 50 is received in the drive carrier 70 by mounting the media drive 50 directly onto the base portion 110. Attachments such as screws or bolts can be used to attach the media drive 50 to the base portion 110.

Figure 4:
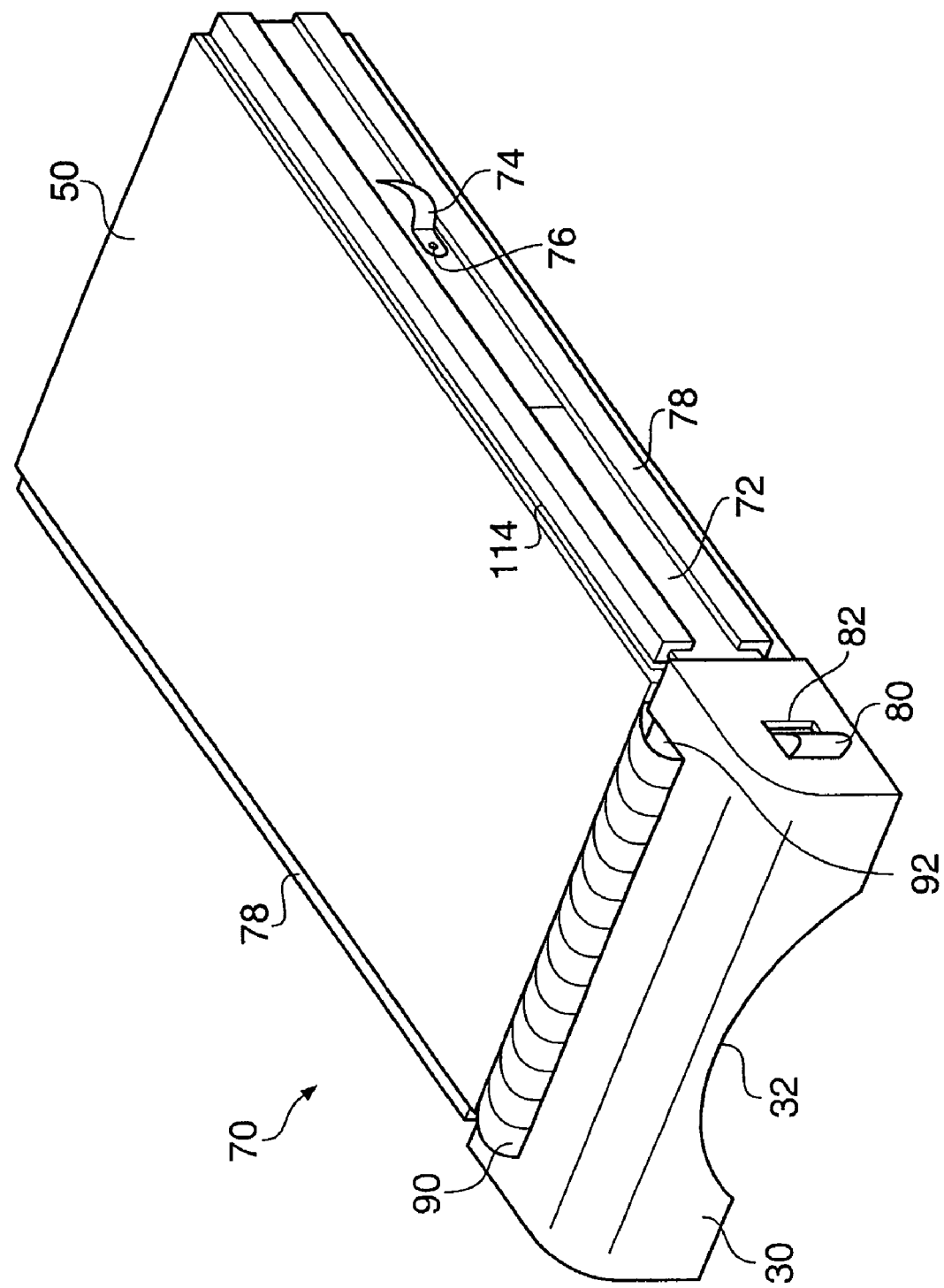
FIGS. 4 and 5 and illustrate an example of a drive carrier having a media drive received therein.

The drive carrier 70 also includes a latch mechanism. The latch mechanism can include a resilient latch portion 80 located toward either side of the handle portion 30, and two apertures 82 through which each of the resilient latch portions 80 can protrude when in a deployed state. The deployed state is illustrated in FIG. 4, which shows one of the resilient latch portions 80 protruding through a corresponding aperture 82 in the handle portion 30. The base portion 110 and the handle portion 30 are configured to cooperate for operating the latch mechanism. In this example, the handle portion 30 can be actuated to move relative to the base portion 110 for operating the latch mechanism. More specifically, and as will be described in more detail below, the handle portion 30 can be moved linearly from a first position (shown in FIG. 4) and second position (shown in FIG. 5), whereby the resilient latch portions 80 engage with one side of their respective apertures 82, and are thereby caused to retract through those apertures 82 into a retracted position.

To facilitate movement of the handle portion 30 relative to the base portion 110, the handle portion 30 can be provided with slides 72, which are received with guide rails 78 attached to the base portion 110. In some examples, the slides 72 can be integrally formed with the remainder of the handle portion 30. The handle portion 30 may be constructed from, for example, a plastics material or from some other non-conductive material. The guide rails 78 may also be formed from a plastics material or some other non-conductive material. The materials used can be chosen to minimise sliding resistance (friction) between the slides 72 and the guide rails 78.

Figure 5:
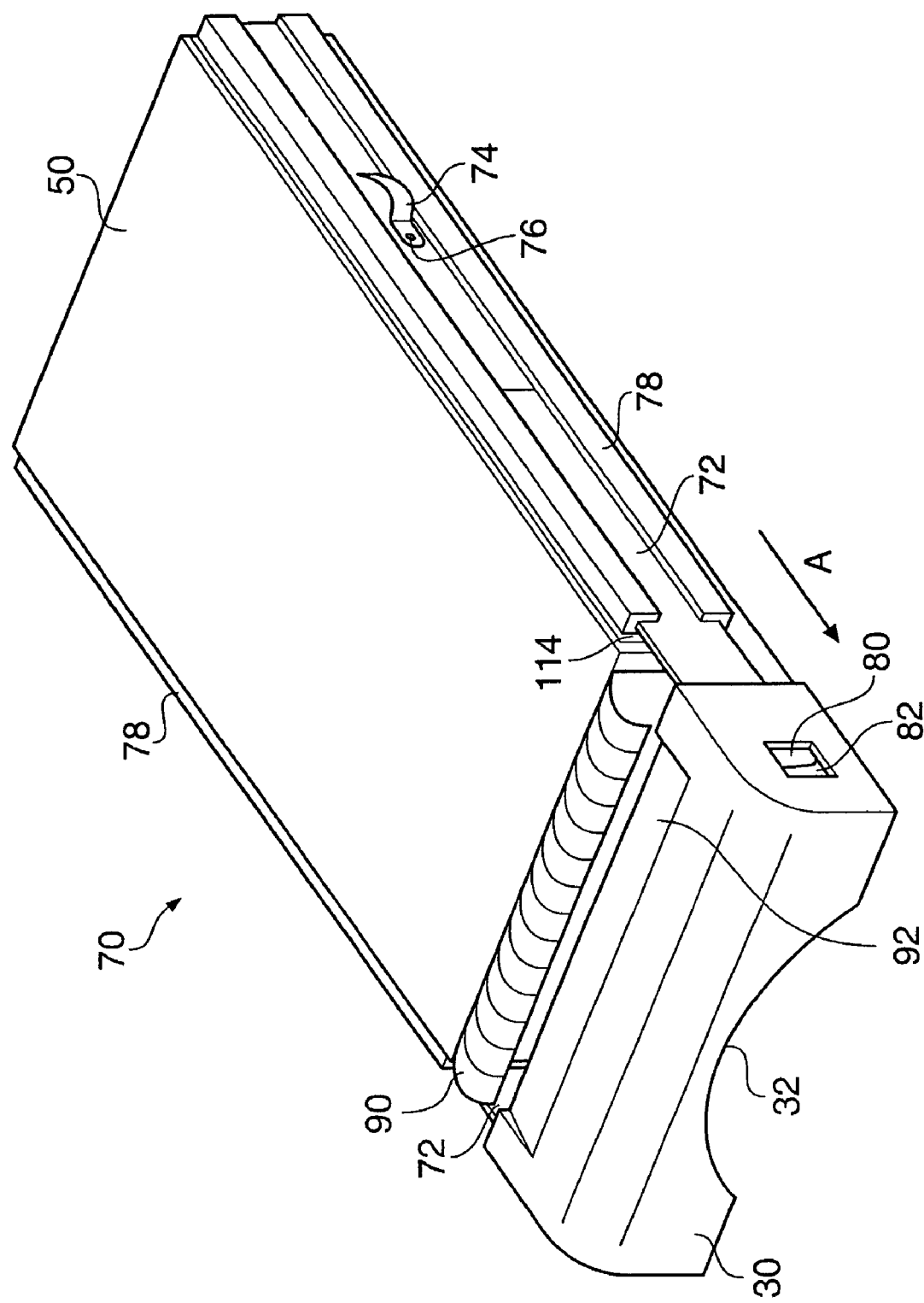
Figure 6:
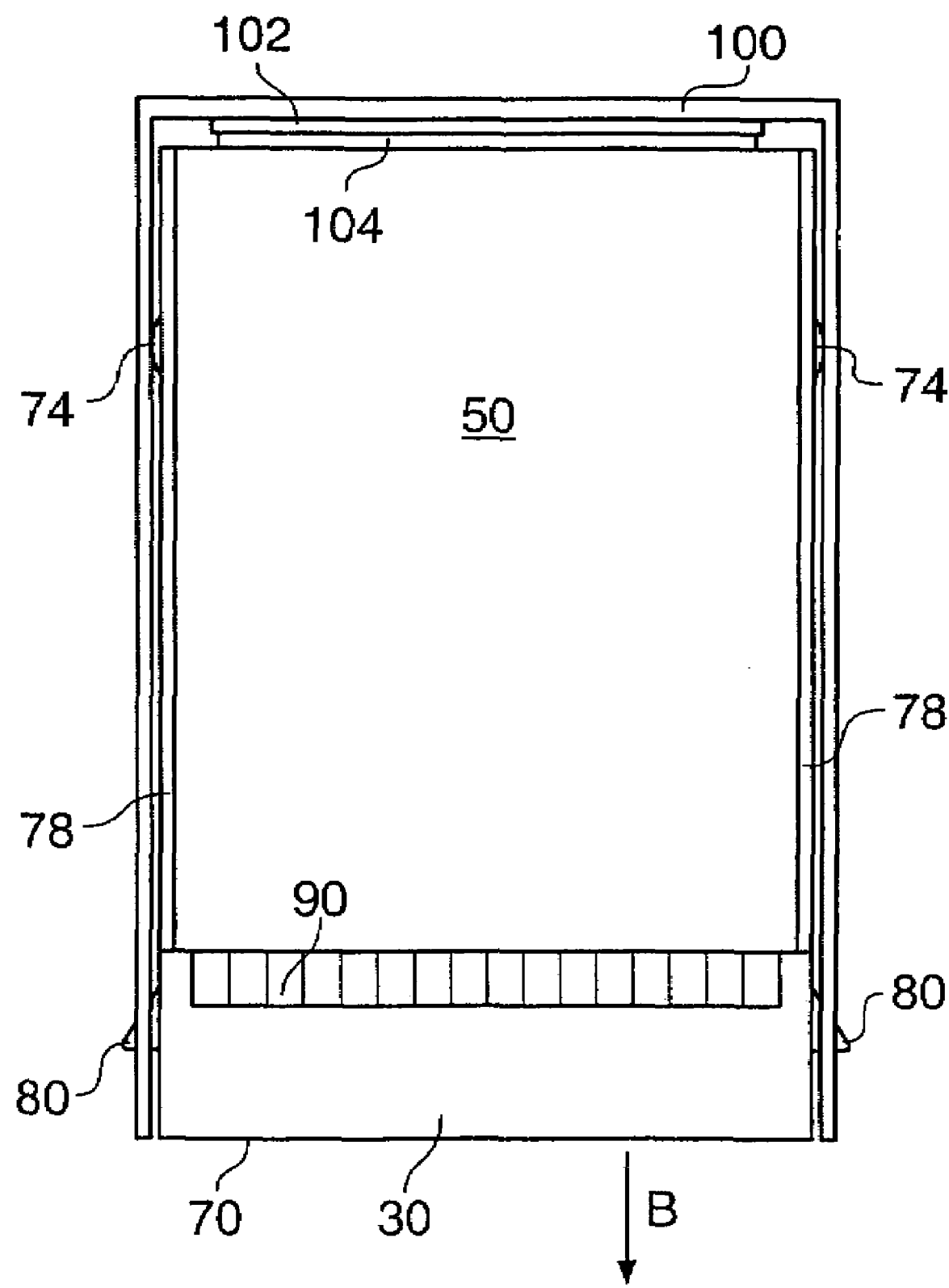
FIGS. 6 and 7 illustrates a receiving location in a computer system, the receiving location having a drive carrier of the type shown in FIGS. 4 and 5 received therein.
Figure 7:
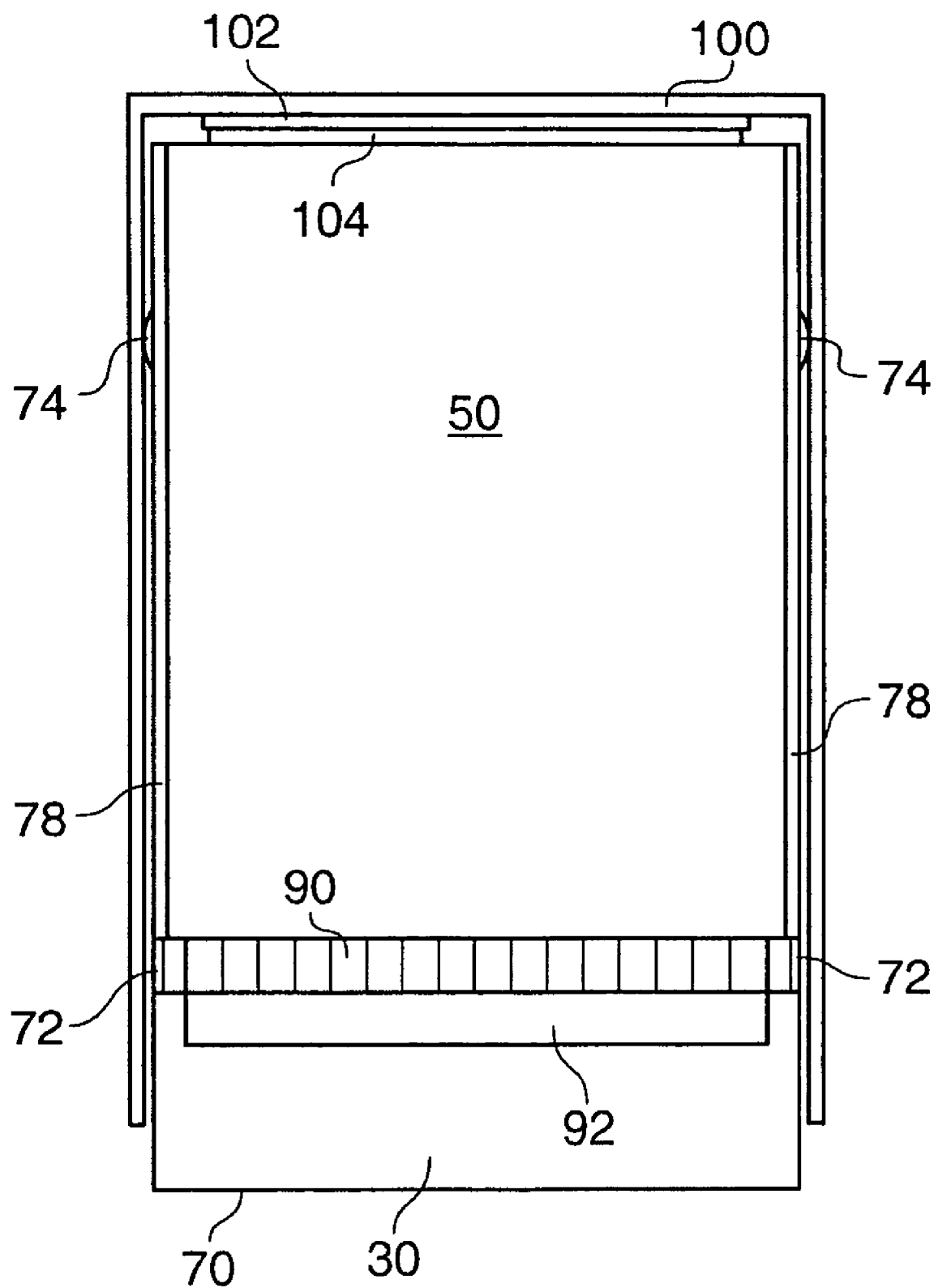

FIGS. 6 and 7 illustrate a receiving location 100 within which there is received a drive carrier 70 such as that illustrated in FIGS. 4 and 5. The media drive 50 has a connector 104 provided on a rear surface thereof, for connecting with a connector 102 of the receiving location 100. In FIG. 6, the latch mechanism is shown in its deployed state. Accordingly, the handle portion 30 is in the first position relative to the base portion 110 as illustrated in FIG. 4. The resilient latch portions 80 of the latch mechanism protrude through the apertures 82 as illustrated in FIG. 4 and engage with formations of the receiving location 100, for securing the drive carrier 70 within the receiving location 100. In this example, the formations with which the latch portions 80 engage are apertures located in the side walls of the receiving location 100. When deployed the resilient latch portions 80 protrude through the apertures of the receiving location and engage therewith. The apertures in this example are so positioned on the side walls of the receiving location 100 such that they align with the apertures 82 of the handle portion 30 when the handle portion is in the first position shown in FIG. 4. The example shown in FIG. 2 includes apertures of this kind, which are visible on the sides of the housing 42.

To remove the drive carrier 70 from the receiving location 100, a user can hold the handle 30 and move it from the first position to the second position by actuating it in the direction generally indicated by the arrow labelled B in FIG. 6. FIG. 7 shows the drive carrier still received within the receiving location 100, but with the handle portion 30 in the second position. As described above, when the handle portion 30 is in the second position, the resilient latch portions 80 are retracted through their respective apertures 82 in the handle portion 30; and accordingly are not visible in FIG. 7. In their retracted positions, the resilient latch portions 82 do not engage with the formations of the receiving location 100 and the drive carrier 70 is not secured within the receiving location 100. The drive carrier 70 can therefore be removed from the receiving location 100 by continuing to pull on the handle portion 30 in the direction shown by the arrow labelled B in FIG. 6 to disengage the connectors 102 and 104 and withdraw the drive carrier 70 from the receiving location 100. In some examples, the drive carrier 70 and/or the receiving location 100 can be provided with formations such as guide rails for guiding the drive carrier 70 as it is inserted and/or withdrawn from the receiving location 100.

The example of a drive carrier 70 shown in FIGS. 4 to 9 also includes a number of features to protect against electromagnetic interference (EMI) and electrostatic discharge (ESD). Attached to a front surface of the media drive 50 is an array of EMI fingers 90. The array 90 includes a plurality of fingers which are curved to protrude outwardly from the drive carrier 70 and engage with a neighbouring surface. The neighbouring surface may, for example, be a surface of a neighbouring drive carrier and/or media drive or a surface of a receiving location. As is most clearly illustrated in FIG. 5, the handle portion 30 includes a ramp 92. When the handle portion 30 is in the second position (as shown in FIG. 5), the fingers of the array 90 occupy a retracted position in which they do not significantly protrude away from the drive carrier 70. For example, the fingers may be flush with the upper surface of the received media drive 50. It is envisaged that when the drive carrier 70 is being inserted or removed from a receiving location 100, the handle portion 30 will be in the second position, whereby the protracted fingers of the EMI array 90 cannot scrape against a neighbouring surface, which would increase sliding resistance against movement of the drive carrier 70 within the receiving location 100 and potentially damage the neighbouring surface.

However, as the handle portion 30 is moved from the second position shown in FIG. 5 to the first position as shown in FIG. 4, the fingers of the EMI array 90 engage with the ramp 92 and are thereby urged outwards and away from the drive carrier 70. Accordingly, moving the handle portion 30 from the second position to the first position can actuate the fingers of the EMI array 90 into a deployed position for abutting against a neighbouring surface. In its deployed position, the EMI array 90 provides an effective EMI gasket for the media drive 50. Conversely, moving the handle portion 30 from the first position shown in FIG. 4 to the second position shown in FIG. 5 actuates the fingers of the EMI array 90 from the deployed position to a retracted position.

The drive carrier 70 also includes two electrostatic discharge (ESD) fingers 74. In this example, the ESD fingers are mounted at the sides of the drive carrier 70. More specifically, the ESD fingers 74 can be mounted using fixings such as screw attachments, rivets or spot welds 76, which pass through the (plastic) guide rails 78 to attach to the base portion 110 and/or the media drive 50. This kind of attachment allows the ESD fingers 74 to be in electrical communication with the base portion 110. In other examples, the ESD fingers 74 may be formed integrally with the base portion 110 and protrude through apertures provided in the guide rails 78. In other examples, the guide rails 78 only extend a limited distance along the sides of the media drive 50, whereby no special arrangement for the ESD fingers 74 and the guide rails 78 is required.

Figure 8:
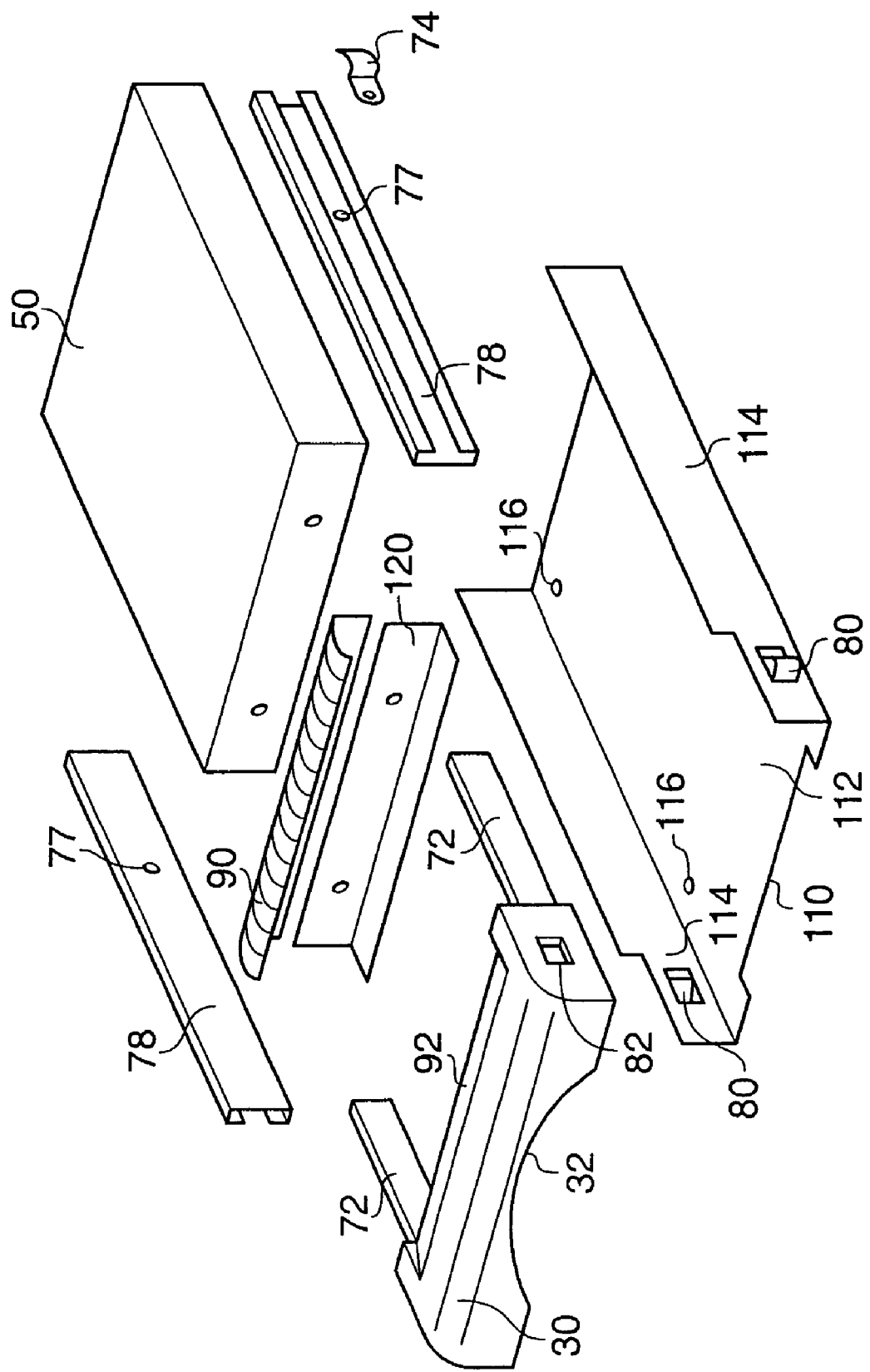
FIG. 8 is an exploded view of a drive carrier of the type shown in FIGS. 4 and 5.

To more clearly illustrate the construction of the drive carrier 70 described above, an exploded view of the drive carrier and media drive 50 is shown in FIG. 8. The base portion 110, can be formed from a metal such as aluminium or stainless steel, includes a lower portion 112 and two side walls 114. In this example, the resilient latch portions 80 of the drive carrier 70 are formed integrally with the side walls 114 of the base portion 110. Alternatively, the latch portions 80 can be formed separately and attached to the side walls 114.

The media drive 50 can be attached to the base portion using, for example, screw attachments. Accordingly, a number of holes 116 are provided in the lower portion 112 of the base portion 110 through which the screws may pass.

The base portion 110 can, for example, be manufactured by stamping out a single flat piece of metal and then folding it to form the side walls 114. The resilient latch portions 80 can be formed by stamping a slot in each side wall 114 and then shaping a flap of metal produced by the slot to protrude outwardly and away from the side walls.

In this example, the guide rails 78 are mounted on the side walls 114. The guide rails can, for example, be mounted by means of a screw attachment which also serves to mount the ESD fingers 74. Further attachments (for example, further screw attachments/rivets/spot welds and/or gluing) can be employed.

The handle portion 30 can be manufactured from a plastics material, for example, by moulding. As described above, the slides 72 are received with the guide rails 78.

The EMI array 90 in this example is attached directly to an outer surface of the media drive 50 such that it is in electrical communication with the media drive 50. Although not visible in FIGS. 4 to 7, the drive carrier 70 can also include an EMI contact plate 120, which is also attached to the media drive 50.

Figure 9A:
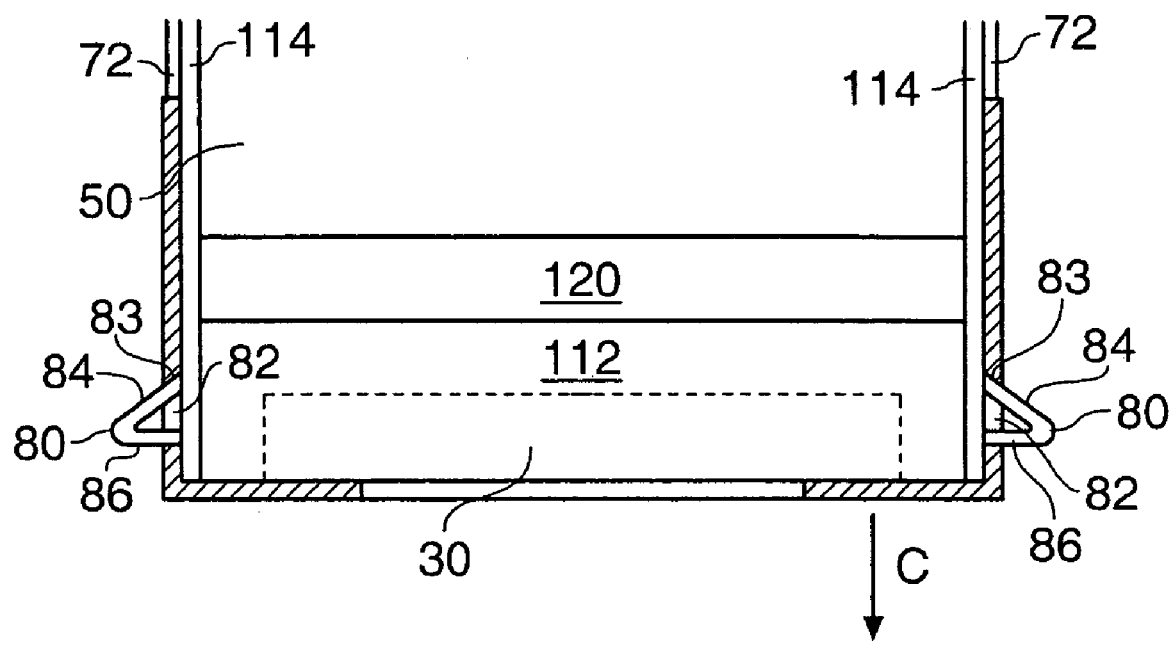
FIGS. 9a and 9b illustrate an example of a latch mechanism for use in a drive carrier such as that shown in FIGS. 4 and 5.
Figure 9B:
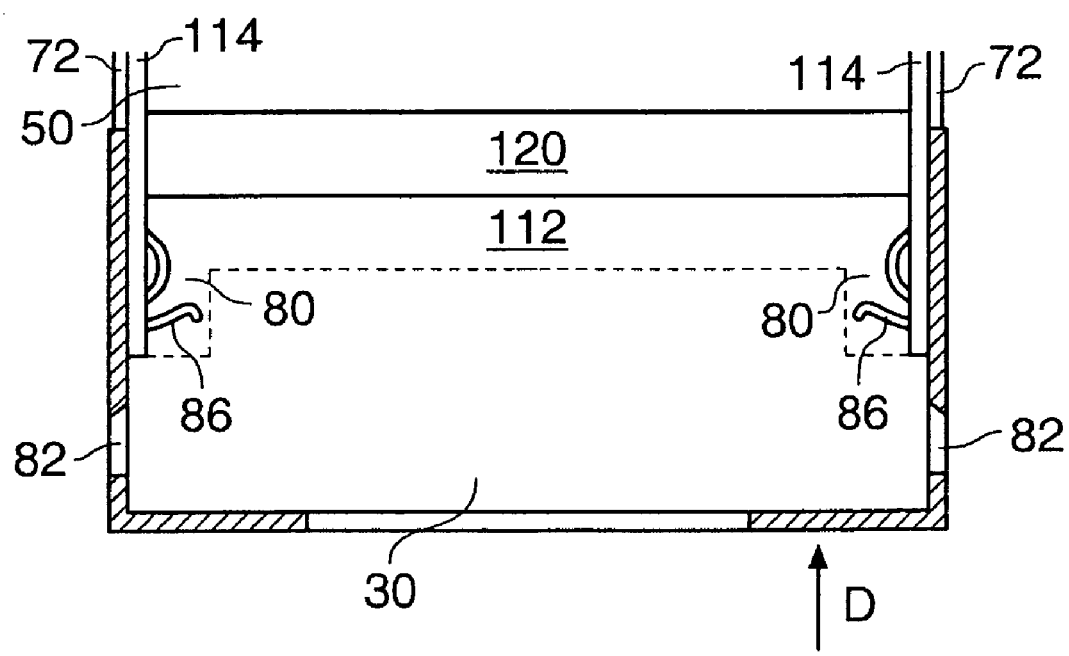

The configuration of the latch mechanism of the drive carrier 70 is now described in more detail with reference to FIG. 9, which shows a view of the handle portion from beneath the drive carrier 70. FIG. 9a shows the handle portion 30 in the first position, while FIG. 9b shows this in the second position. In FIGS. 9a and 9b the lower portion 112 of the base portion 110 is indicated only by a dotted line so as not to obscure the components located behind it. Also, in FIGS. 9a and 9b the handle portion 30 is shown in cross section to more clearly illustrate the configuration of the apertures 82.

FIG. 9a shows the latch mechanism in its deployed state. The resilient latch portions 80 each protrude through a respective aperture 82 in the handle portion 30. Each resilient latch portion 80 has an engaging edge 86 and sloped edge 84. The engaging edge 86 is substantially perpendicular to the side walls 114 of the base portion 110. Accordingly, when the latch mechanism is deployed, the engaging edge 86 can abut against an engaging formation of a receiving location thereby to prevent removal of the drive carrier 70 from that receiving location. The sloped edge 84 allows movement of the handle portion 30 to cause the retraction/deployment of the resilient latch portions 80, which are biased outward and away from the side walls 114. From the first position shown in FIG. 9a, to retract the latch mechanism so that the drive carrier 70 can be inserted/removed from a receiving location, a user can grip the handle portion 30 and slide it in the direction shown by the arrow labelled C. As the handle portion 30 moves in the direction of the arrow labelled C, the sloped edge 84 of each resilient latch portion rise against a leading edge wall 83 of each aperture 82. The leading edge walls 83 push against the sloped edges 84 and thereby cause the resilient latch portions 80 to be retracted through the apertures 80 to a retracted position.

The retracted position of the resilient latch portions 80 is illustrated in FIG. 9b. In FIG. 9b the latch portion 30 is in the second position described above in relation to FIG. 5. As is illustrated in FIG. 9b, the resilient latch portions 80 are retracted to a position within the handle portion and do not protrude through the apertures 82. Consequently, the resilient latch portions 80 cannot engage with any engaging formations of a receiving location when in the retracted position, and do not hinder insertion and/or removal of the drive carrier 70 from a receiving location 100.

To return the latch mechanism to its deployed state, a user can grip the handle 30 and move it in the direction shown generally in FIG. 9b by the arrow labelled D. Since the resilient latch portions 80 are biased outward and away from the side walls 114, when the handle portion 30 is in the second position shown in FIG. 9b, the resilient latch portions 80 urge against the inner side walls of the handle portion. Accordingly, as the handle portion is moved toward the position shown in FIG. 9a, the apertures 82 come into alignment with the resilient latch portions 80 and the resilient latch portions 80 spring into their deployed position.

Accordingly, linear movement of the handle portion 30 relative to the base portion 110 allows operation of the latch mechanism between a deployed state and a retracted state. Furthermore, as described above, movement of the handle portion 30 between the first position and the second position can cause the deployment/retraction of the fingers of an EMI finger array.

A number of further examples of drive carriers will now be described with reference to FIGS. 10 to 13. An exploded view of each example is shown in those Figures.

Figure 10:
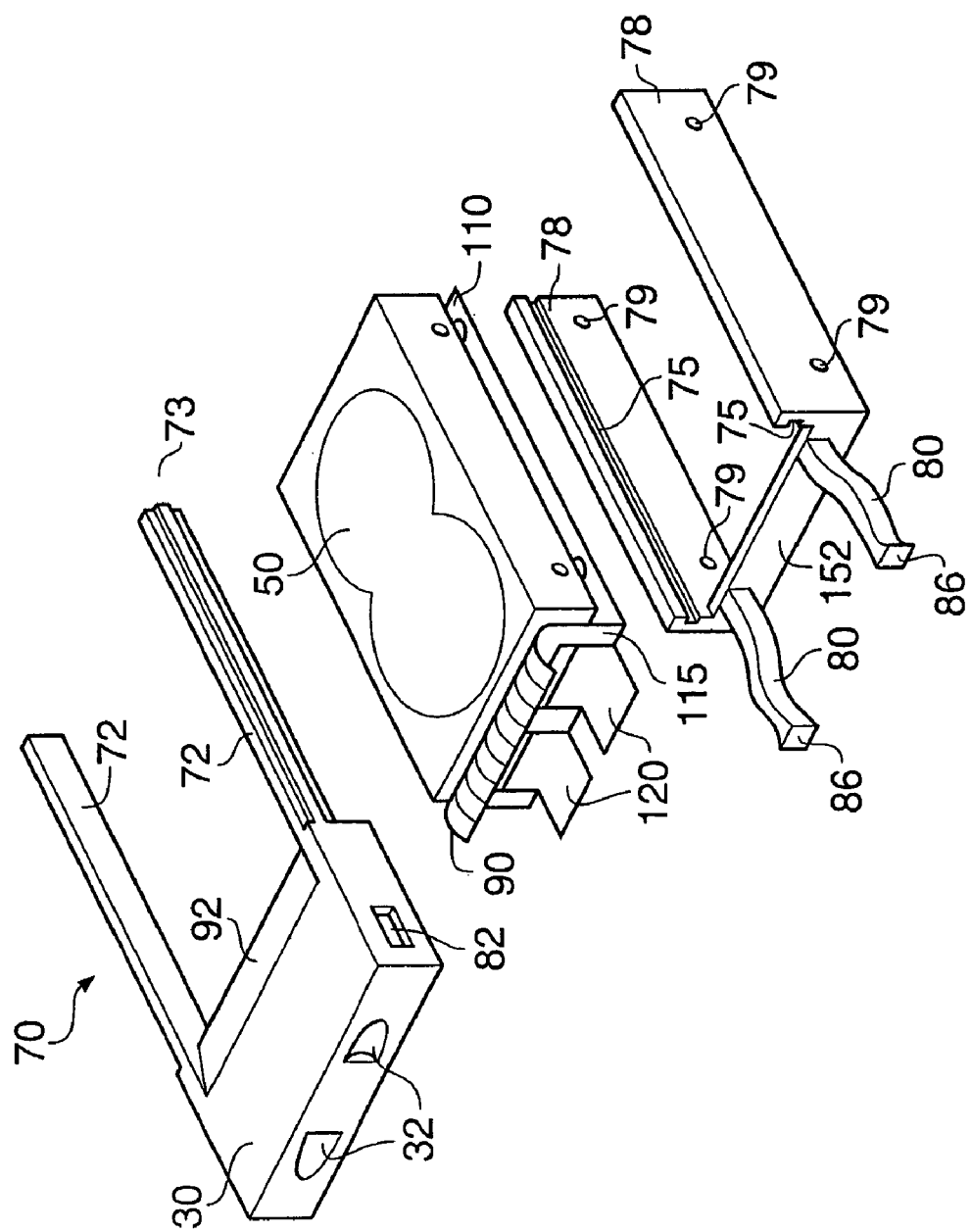
FIG. 10 is an exploded view of another example of a drive carrier.

The example shown in FIG. 10 has a base portion 110 which has a front wall 115, a pair of EMI contact plates 120 and an array of EMI fingers all integrally formed therewith. The base portion 110 in this example may be manufactured, for example, using a single piece of stamped metal folded to form the front wall 115, EMI contact plates and EMI array.

In this example, the drive carrier 70 includes two side walls 78 which are joined by a front wall 152. When assembled, the media drive is mounted upon the base portion 110 and the media drive is positioned in between the side walls 78. The side walls are attached to side walls of the media drive using attachments 79 such as screw attachments. When assembled, the EMI finger array 90 and the EMI contact plates 120 reach above and under the front wall 152 respectively.

Each of the sides 78 include a guide rail 75 within which tongue portions 73 of the slides 72 of the handle portion 30 are accommodated.

In this example, the resilient latch portions 80 protrude from the front wall 152. The resilient latch portions 80, the front wall 152 and the sides 78 may all be integrally formed, for example they may all be formed from a single piece of moulded plastics material.

The operation of the latch mechanism and the EMI finger array 90 in this example is similar to that described above. Movement of the handle portion 30 relative to the base portion 110 can cause the latch mechanism to deploy/undeploy by allowing the resilient latch portions 80 to deploy through the apertures 82 in the handle 30 or by retracting the resilient latch portions 80 through those apertures 82. Movement of the handle portion 30 relative to the base portion 110 can also cause deployment/retraction of the EMI finger array, which rides upon the ramp 92 of the handle portion 30 as described above.

While not explicitly shown in FIG. 10, one or more ESD fingers may be deployed to provide protection against electrostatic discharge. These fingers may, for example, be provided on the outer faces of the slide walls 78 to protrude away from the media drive 50 and urge against, for example, a wall of receiving location.

Figure 11:
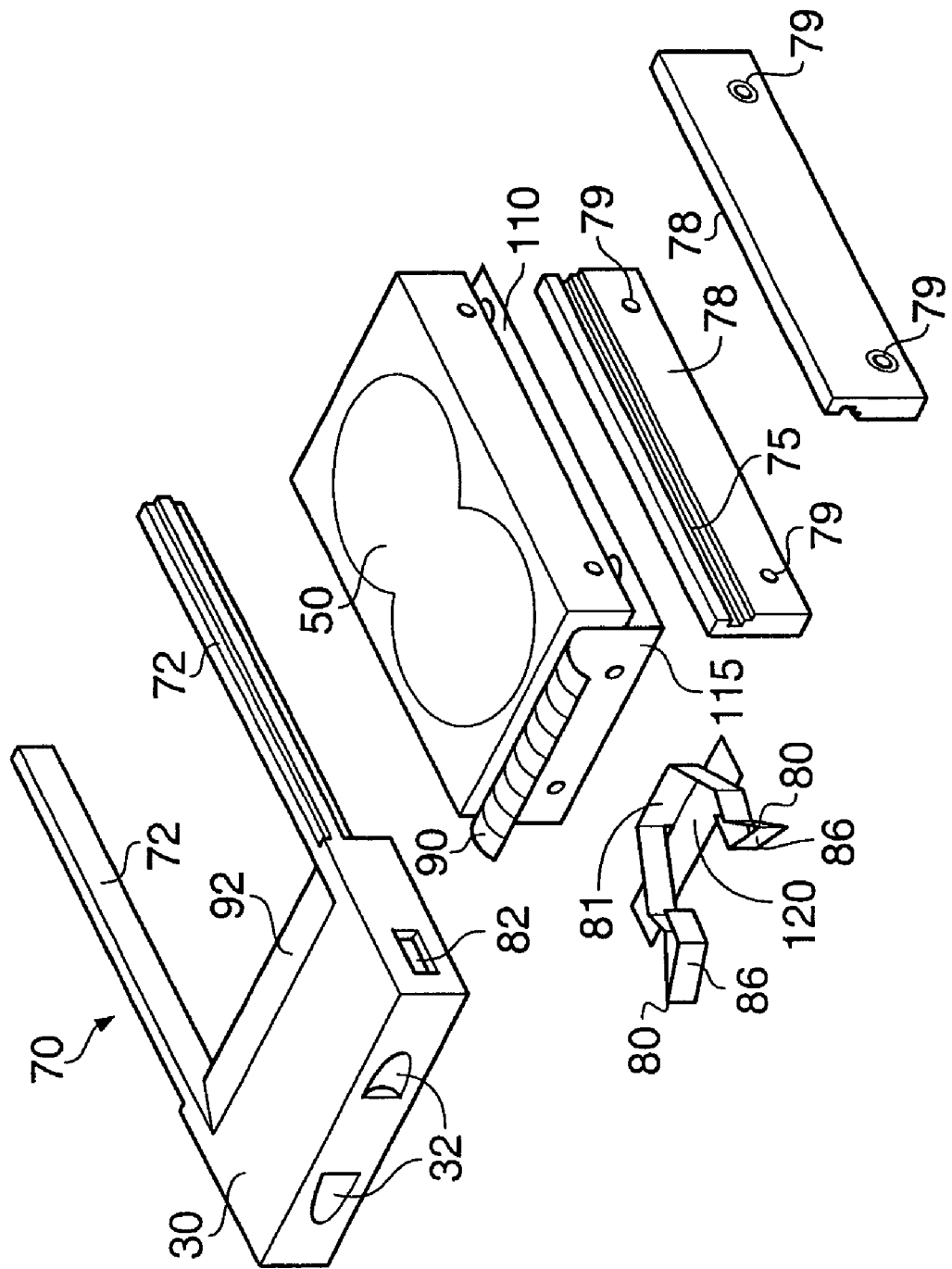
FIG. 11 is an exploded view of further example of a drive carrier.

The example shown in FIG. 11 includes a base portion 110 with which is integrally formed a front wall 115 and an EMI finger array 90. As described above, the base portion in this example may be formed from a single piece stamped metal folded into shape.

The drive carrier 70 includes two sides 78 which can be mounted on the sides of the media drive 50 using attachments 79 such as screw attachments. Each of the sides 78 includes a guide rail 75 for receiving the tongue portions 73 of respective slides 72 of the handle portion 30 as described above in relation to FIG. 10.

In this example, the latch mechanism includes a single piece of folded metal 81, which is mounted on the front face 115. The piece of metal 81 is folded to form two resilient latch portions 80, which can protrude through the apertures 82 of the handle portion 30 or be retracted through those apertures 82 as described above. The piece of metal 81 may comprise a springy metal so as to allow it to be biased outward from the drive carrier 70 which it is deployed. Also provided is an EMI contact plate 120, which also serves to prevent misalignment of the resilient latch portions.

In common with the examples described above, the present example may also include one or more ESD fingers.

Figure 12:
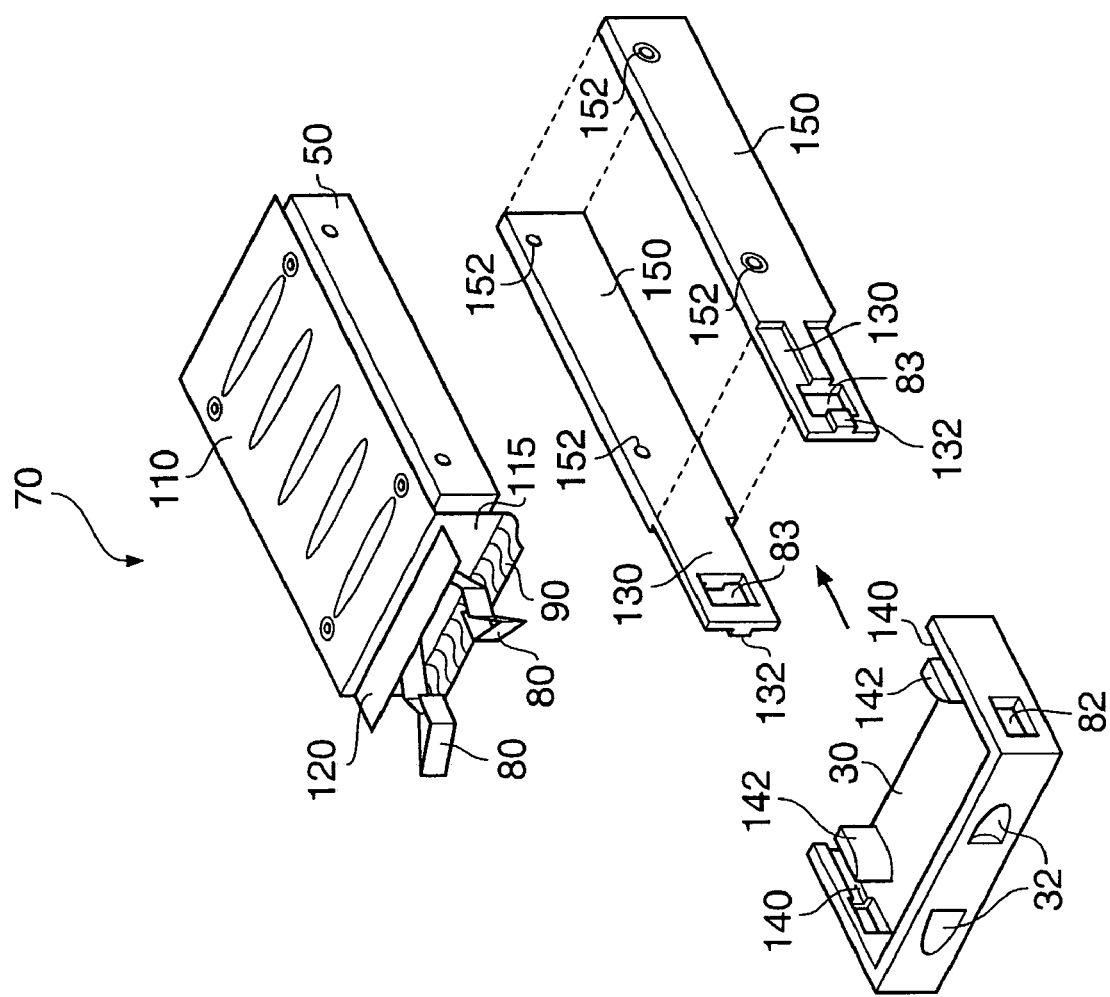
FIG. 12 is an exploded view of another example of a drive carrier.

In the example shown in FIG. 12, the handle portion does not include slides such as those described in respect of the examples given above. Instead, the handle portion is provided guide rails 140 within which the tongue portions 132 of the sides 150 of the drive carrier 70 are received. The sides 150 are mounted on the sides of the drive carrier using attachments 152 such as screw attachments as described above. The sides 150 are also provided with apertures 83 through which the resilient latch portions 80 may protrude, when those apertures 83 are aligned with the apertures 82 of the handle portion 30. In this example, the handle portion 30 is provided with two guiding features 142 which served to prevent misalignment of both the portions 130 of the sides 150 which bear the tongue portions 132. These guide features 142 can also serve to guide the resilient latch portions 80.

Figure 13:
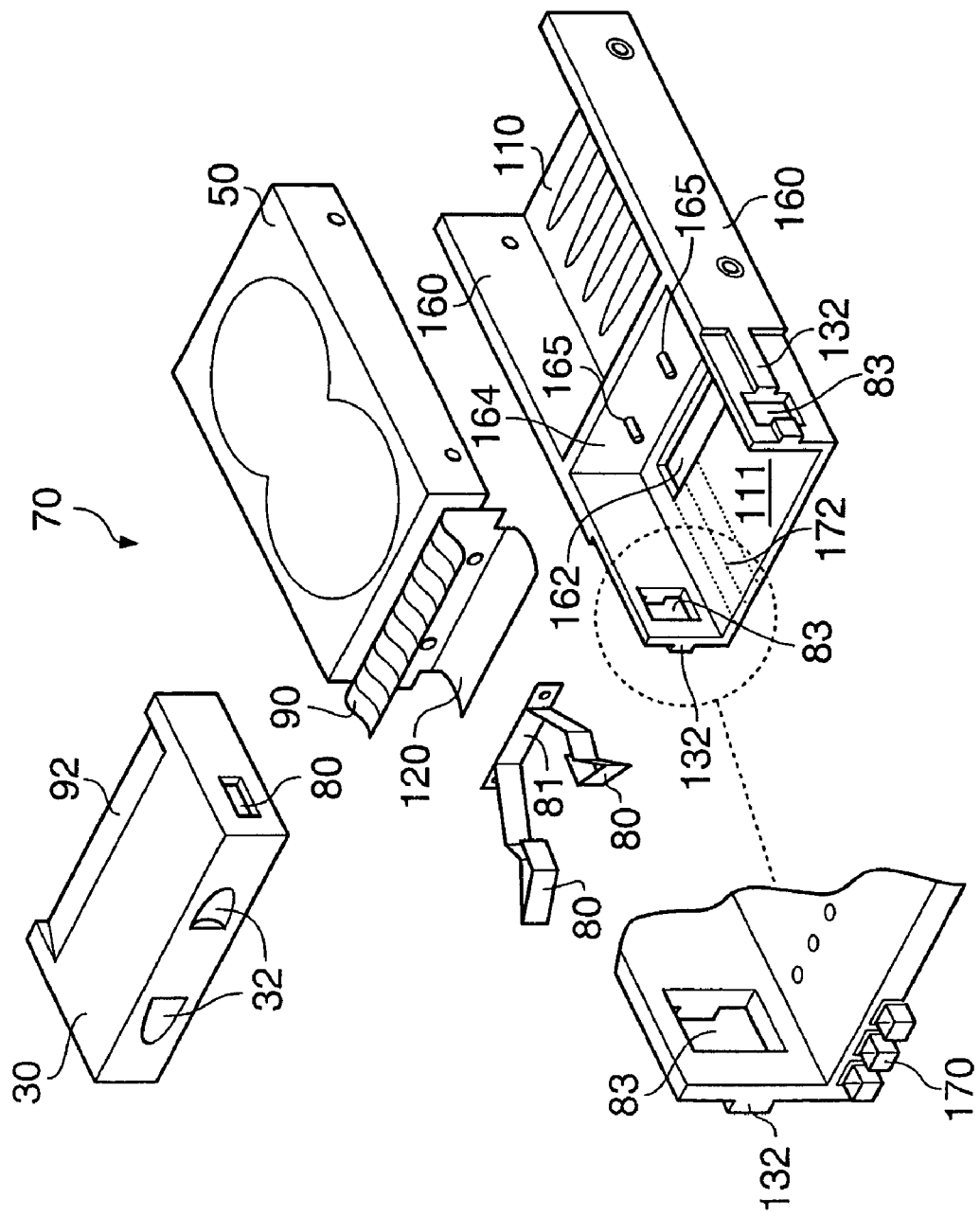
FIG. 13 is an exploded view of further example of a drive carrier and illustrates how light pipes can be incorporated into a handle of the drive carrier.

FIG. 13 illustrates one example of how light pipes 172 may be employed to carry indicator signals from the media drive 50 to the front of the drive carrier 70. In this example, the base portion 110 includes a front portion 111, which extends between the sides 160 and toward the front of the drive carrier 70. The front portion 111 has mounted within it three light pipes (shown as the dashed line in FIG. 13). The light pipes 172 terminates at the front of the front portion 111, where appropriate caps 170 may be provided.

In this example, the base portion 110 is provided with a dividing wall 164. The EMI finger array 90 and EMI contact plate 120 in this example can be mounted on the dividing wall 164 using attachments 165 such as screw attachments, rivets or spot welds. When mounted, the EMI contact plate 120 can align with and extend through an aperture 162, which is provided in the front portion 111 of the base portion 110.

In common with the examples described above, one or more ESD fingers may be provided. These ESD fingers may, for example, be mounted on the sides 160 of the drive carrier 70.

In all of the examples shown above, the handle portion 30 can include features 32 for facilitating a user to grip the handle portion 30. In the example shown in FIGS. 4 to 9, a curved slot 32 is provided on the handle portion to allow a users fingers to engage with the underside of the handle portion 30. In the examples shown in FIGS. 10 to 13, two depressions 32 are formed in the handle portion 30 for a user to hold.

Examples of methods for installing/removing a media drive in a computer system will now be described with reference to the examples of drive carriers described above.

To install a media drive 50 in a computer system, the media drive 50 can be received within a drive carrier such as one of those described above. The handle portion 30 of the drive carrier 70 can then be moved to the second position whereby the latch mechanism is in a retracted state. Holding the handle, the user can then, with a single movement, slide the drive carrier holding the media drive 50 into the receiving location 100 of a computer system. As the drive carrier 70 is inserted into the receiving location 100 any connectors on the rear of the media drive 50 will eventually meet and connect with corresponding connectors of the receiving location 100. Once the drive carrier 70 is positioned correctly within the receiving location 100 the user can continue to push the handle portion 30 toward the receiving location 100, whereby the handle portion 30 can be actuated from a second position to a first position as described above. This operates the latch mechanism into its deployed state. For example, resilient latch portions such as those described above may deploy through apertures in the handle portion 30 to engage with engaging formations of the receiving location 100 such as apertures which are aligned with the apertures of the handle portion 30.

Accordingly, a single linear movement, when holding the handle portion 30, can be used to both insert the drive carrier 70 into the receiving location 100 and to operate the latch mechanism. In this example, the movement is a single, linear movement in the direction of insertion of the drive carrier within the receiving location.

This single movement can also cause the fingers of an EMI finger array to be deployed to urge against, for example, a wall of the receiving location 100 as described above.

To remove the media drive 50 from the computer system, a user can move the handle portion 30 from the first position to the second position which, as described above, operates the latch mechanism to move into a retracted state. For example, resilient latch portions of the latching mechanism may be caused to retract through apertures in the handle portion 30. Once the latch mechanism is in its retracted state, the user may continue to pull on the handle portion 30 to disconnect any connectors of the media drive 50 from corresponding connectors within the receiving location 100 and to withdraw the drive carrier from the receiving location 100.

Accordingly, a single linear movement allows the latch mechanism to be operated to move into a retracted state and also allows the drive carrier 70 to be withdrawn from the receiving location 100. In this example, the movement is a single, linear movement in the direction of withdrawl of the drive carrier from the receiving location.

As described above, this single linear movement may also cause the retraction of the fingers of an EMI finger array where such an array is provided. Retraction of any EMI fingers is beneficial prior to withdrawal of the drive carrier 70 from the receiving location 100, since this reduces sliding resistance and also prevents damage (scraping) of neighbouring components such as a neighbouring media drive.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A drive carrier configured to receive a media drive and configured to be removably receivable in a receiving location of a computer system, the carrier comprising:
   a base portion;
   a handle portion; and
   a latch mechanism for securing the carrier within the receiving location, wherein the base portion and the handle portion are configured to co-operate to operate the latch mechanism on insertion and/or removal of the carrier from the receiving location, for inserting and/or removing the carrier from the receiving location and operating the latch mechanism with a single linear movement of the handle portion in a direction of insertion/removal of the drive carrier from the receiving location;
   wherein the handle portion is operable to move between a first position and a second position relative to the base portion to operate the latch mechanism; and
   wherein the handle portion and the base portion are two separate parts of the carrier that are coupled together and move independent of each other through at least part of the handle portion's movement between the first position and the second position.

2. The drive carrier of claim 1, wherein when the handle portion is in the first position, the latch mechanism is in a deployed state for securing the drive carrier within the receiving location, and when the handle portion is in the second position, the latch mechanism is in a retracted state for allowing insertion and/or removal of the drive carrier from the receiving location.

3. A drive carrier configured to receive a media drive and configured to be removably receivable in a receiving location of a computer system, the carrier comprising:
   a base portion;
   a handle portion; and
   a latch mechanism for securing the carrier within the receiving location, wherein the base portion and the handle portion are configured to co-operate to operate the latch mechanism on insertion and/or removal of the carrier from the receiving location, for inserting and/or removing the carrier from the receiving location and operating the latch mechanism with a single linear movement of the handle portion in a direction of insertion/removal of the drive carrier from the receiving location;
   wherein the handle portion is operable to move between a first position and a second position relative to the base portion to operate the latch mechanism; and
   wherein the single movement of the handle portion includes actuating the handle portion between the first position and the second position;
   wherein when the handle portion is in the first position, the latch mechanism is in a deployed state for securing the drive carrier within the receiving location, and when the handle portion is in the second position, the latch mechanism is in a retracted state for allowing insertion and/or removal of the drive carrier from the receiving location;
   wherein the latch mechanism comprises a resilient latch portion and an aperture in the handle portion,
   wherein when the latch mechanism is in the deployed state, the resilient latch portion protrudes through the aperture in the handle portion such that the resilient latch portion is configured for engagement with a formation of the receiving location, and
   wherein movement of the handle portion from the first position to the second position causes the resilient latch portion to be retracted through the aperture in the handle portion.

4. The drive carrier of claim 3, wherein the latch portion is integrally formed with the base portion.

5. The drive carrier of claim 3, wherein the latch portion comprises a folded portion of springy metal.

6. The drive carrier of claim 3, wherein when the latch mechanism is in the retracted state, the latch portion urges against an inner surface of the handle portion.

7. The drive carrier of claim 1, further comprising a plurality of electromagnetic interference (EMI) fingers configured to switch between:
   a deployed position in which the EMI fingers abut against a neighboring drive carrier, media drive or inner wall of the receiving location; and
   a retracted position in which the EMI fingers retract from the deployed position to reduce sliding resistance on insertion and/or removal of the drive carrier from the receiving location.

8. The drive carrier of claim 7,
   wherein the handle portion is operable to move between the first position and the second position relative to the base portion for operating the latch mechanism and for moving the EMI fingers between the deployed position and the retracted position respectively,
   wherein, to move the EMI fingers to the deployed position, the handle portion contacts a portion of the EMI fingers to urge the EMI fingers into engagement with the neighboring drive carrier, media drive or inner wall of the receiving location, and
   wherein the single movement of the handle portion includes actuating the handle portion between the first position and the second position.

9. The drive carrier of claim 8,
   wherein the EMI fingers are fixed relative to the base portion, and
   wherein the handle portion comprises a ramp upon which the EMI fingers are operable to ride, whereby movement of the handle portion from the second position to the first position causes the ramp portion to urge the EMI fingers into the deployed position.

10. The drive carrier of claim 7, wherein the EMI fingers are integrally formed with the base portion.

11. The drive carrier of claim 1, wherein the handle portion comprises one or more light pipes for directing light from an indicator light of a received media drive.

12. The drive carrier of claim 1, comprising one or more electrostatic discharge (ESD) fingers configured to urge against an inner wall of the receiving location when the drive carrier is received in the receiving location.

13. The drive carrier of claim 12, wherein one or more of the ESD fingers are formed integrally with the base portion.

14. The drive carrier of claim 1, further comprising one or more formations for guiding movement of the carrier within the receiving location.

15. The drive carrier of claim 1, wherein the base portion comprises a plastics material.

16. A computer system comprising:
   a receiving location; and
   a drive carrier removably received within the receiving location, the drive carrier being configured to receive a media drive and comprising:
   a base portion;
   a handle portion; and
   a latch mechanism for securing the carrier within the receiving location, wherein the base portion and the handle portion are configured to co-operate to operate the latch mechanism on insertion and/or removal of the carrier from the receiving location, for inserting and/or removing the carrier from the receiving location and operating the latch mechanism with a single linear movement of the handle portion in a direction of insertion/removal of the drive carrier from the receiving location;
   wherein the handle portion is operable to move between a first position and a second position relative to the base portion to operate the latch mechanism;
   wherein the single movement of the handle portion includes actuating the handle portion between the first position and the second position;
   wherein the receiving location comprises a formation;
   wherein the latch mechanism comprises a resilient latch portion and an aperture in the handle portion;
   wherein when the latch mechanism is in a deployed state, the resilient latch portion protrudes through the aperture in the handle portion such that the resilient latch portion is configured to engage with the formation of the receiving location, and
   wherein movement of the handle portion from the first position to the second position causes the resilient latch portion to be retracted through the aperture in the handle portion.

17. The computer system of claim 16, further comprising at least one additional drive carrier and media drive received with the receiving location.

18. A method of removing a media drive from a computer system, the method comprising:
   providing a drive carrier having the media drive received therein, the drive carrier being removably received within a receiving location of the computer system, the drive carrier comprising:
   a base portion;
   a handle portion; and
   a latch mechanism for securing the carrier within the receiving location, wherein the base portion and the handle portion are configured to co-operate to operate the latch mechanism on insertion and/or removal of the carrier from the receiving location, for inserting and/or removing the carrier from the receiving location and operating the latch mechanism with a single linear movement of the handle portion in a direction of insertion/removal of the drive carrier from the receiving location;
   wherein the handle portion is operable to move between a first position and a second position relative to the base portion to operate the latch mechanism; and
   wherein the handle portion and the base portion are two separate parts of the carrier that are coupled together and move independent of each other through at least part of the handle portion's movement between the first position and the second position; and
   moving the handle portion in a linear direction to operate the latch mechanism and remove the carrier from the receiving location.

19. The method of claim 18, wherein the single movement includes actuating the handle portion relative to the base portion from the first position in which the latch mechanism is in a deployed state for securing the drive carrier within the receiving location to the second position in which the latch mechanism is in a retracted state.

20. The method of claim 19, wherein the single movement subsequently includes sliding the drive carrier and the media drive out from the receiving location.

21. A method of installing a media drive in a computer system, the method comprising:
   providing a drive carrier having the media drive received therein, the drive carrier comprising:
   a base portion;
   a handle portion; and
   a latch mechanism for securing the carrier within a receiving location, wherein the base portion and the handle portion are configured to co-operate to operate the latch mechanism on insertion and/or removal of the carrier from the receiving location, for inserting and/or removing the carrier from the receiving location and operating the latch mechanism with a single linear movement of the handle portion in a direction of insertion/removal of the drive carrier from the receiving location;
   wherein the handle portion is operable to move between a first position and a second position relative to the base portion to operate the latch mechanism; and
   wherein the handle portion and the base portion are two separate parts of the carrier that are coupled together and move independent of each other through at least part of the handle portion's movement between the first position and the second position; and
   moving the handle portion in a linear direction to insert the carrier within the receiving location and to operate the latch mechanism.

22. The method of claim 21, wherein the single movement is a single, linear movement in the direction of insertion of the drive carrier within the receiving location.

23. The method of claim 21, wherein the single movement includes sliding the drive carrier and the media drive into the receiving location.

24. The method of claim 23,
   wherein the single movement subsequently includes actuating the handle portion relative to the base portion from the second position in which the latch mechanism is in a retracted state to the first position in which the latch mechanism is in a deployed state for securing the drive carrier within the receiving location.

25. The drive carrier of claim 1, wherein the single linear movement comprises a sliding movement of the handle portion on the base portion in a linear direction with respect to the base portion.

26. The drive carrier of claim 1,
wherein the latch mechanism comprises a pair of resilient latching portions on opposing sides of the carrier,
wherein the handle portion is configurable to retract both of the resilient latch portions with a single linear movement of the handle portion with respect to the base portion.

27. The drive carrier of claim 1,
wherein the base portion or the handle portion comprises a slide and the other of the base portion or the handle portion comprises a guide rail; and
wherein movement of the handle portion between the first position and the second position relative to the base portion includes movement of the slide relative to the guide rail.

28. The drive carrier of claim 27, wherein movement of the handle portion between the first position and the second position relative to the base portion comprises sliding the handle portion relative to the base portion.

29. The drive carrier of claim 1, wherein the handle portion and the base portion are separable pieces.

30. The drive carrier of claim 1,
wherein the handle portion comprises an aperture and the latch mechanism comprises a resilient latch portion; and
wherein the resilient latch portion is operable to protrude through the aperture in the handle portion.

31. The drive carrier of claim 30, wherein movement of the handle portion from the first position to the second position causes the resilient latch portion to be retracted through the aperture in the handle portion.

32. A drive carrier configured to receive a media drive and configured to be removably receivable in a receiving location of a computer system, the carrier comprising:
a base portion;
a handle portion comprising an aperture; and
a latch mechanism for securing the carrier within the receiving location, wherein the latch mechanism comprises a resilient latch portion;
wherein the base portion and the handle portion are configured to co-operate to operate the latch mechanism on insertion and/or removal of the carrier from the receiving location, for inserting and/or removing the carrier from the receiving location and operating the latch mechanism with a linear movement of the handle portion in a direction of insertion/removal of the drive carrier from the receiving location;
wherein the handle portion is operable to move between a first position and a second position relative to the base portion to operate the latch mechanism; and
wherein when the handle portion is in the first position, the resilient latch portion protrudes through the aperture in the handle portion; and
wherein when the handle portion is in the second position, the resilient latch portion is retracted through the aperture in the handle portion.

33. The drive carrier of claim 32, further comprising a plurality of electromagnetic interference (EMI) fingers configured to switch between:
a deployed position in which the EMI fingers abut against a neighboring drive carrier, media drive or inner wall of the receiving location; and
a retracted position in which the EMI fingers retract from the deployed position to reduce sliding resistance on insertion and/or removal of the drive carrier from the receiving location.

34. The drive carrier of claim 33,
wherein the handle portion is operable to move between the first position and the second position relative to the base portion for operating the latch mechanism and for moving the EMI fingers between the deployed position and the retracted position respectively,
wherein, to move the EMI fingers to the deployed position, the handle portion contacts a portion of the EMI fingers to urge the EMI fingers into engagement with the neighboring drive carrier, media drive or inner wall of the receiving location, and
wherein the single movement of the handle portion includes actuating the handle portion between the first position and the second position.

* * * * *